United States Patent [19]
Hoffman et al.

[11] 3,896,356
[45] July 22, 1975

[54] METHOD AND CONTROL SYSTEM FOR IMPROVED STABILITY OF AN INDUCTION MOTOR VIA INDEPENDENT VOLTAGE, SYNCHRONOUS FREQUENCY, AND SLIP FREQUENCY CONTROL AT AN OPERATING POINT

[75] Inventors: Robert E. Hoffman, Erie, Pa.; John A. Cline, Pittsfield, Mass.; Christopher S. Fuselier, Pittsfield, Mass.; John D. D'Atre, Pittsfield, Mass.

[73] Assignee: General Electric Company

[22] Filed: June 5, 1974

[21] Appl. No.: 476,433

Related U.S. Application Data

[63] Continuation of Ser. No. 326,449, Jan. 24, 1973, abandoned.

[52] U.S. Cl. ............... 318/227; 318/230; 318/231
[51] Int. Cl. .................................................. H02p 5/40
[58] Field of Search.................... 318/227, 230, 231

[56] References Cited
UNITED STATES PATENTS

| | | |
|---|---|---|
| 3,372,323 | 3/1968 | Guyeska .................... 318/231 X |
| 3,512,067 | 5/1970 | Landau ............................ 318/227 |
| 3,593,083 | 7/1971 | Blaschke ..................... 318/231 X |
| 3,671,831 | 6/1972 | Chausse et al. .................... 318/227 |
| 3,675,099 | 7/1972 | Johnston ........................... 318/227 |
| 3,700,986 | 10/1972 | Cushman et al. .............. 318/230 X |

*Primary Examiner*—G. Z. Rubinson
*Attorney, Agent, or Firm*—Francis K. Richwine

[57] ABSTRACT

The invention relates to a method and control system to improve stability of an induction motor by means of regulating, independently, the voltage, the synchronous frequency applied to the motor and the slip frequency of the motor. The system applies a voltage to the motor at a synchronous frequency and at a magnitude derived from an error signal indicative of the differences between a desired rotor speed or position and the true rotor speed or position. The synchronous frequency as determined by this control system is the sum of a desired slip frequency and a desired rotor frequency.

9 Claims, 4 Drawing Figures

METHOD AND CONTROL SYSTEM FOR IMPROVED STABILITY OF AN INDUCTION MOTOR VIA INDEPENDENT VOLTAGE, SYNCHRONOUS FREQUENCY, AND SLIP FREQUENCY CONTROL AT AN OPERATING POINT

This is a continuation of application Ser. No. 326,449, filed Jan. 24, 1973, and now abandoned.

BACKGROUND OF THE INVENTION

1. Field of the Invention

This invention relates to a method and control system for dynamoelectric machines and more particularly to a method and control system for improving the operational stability of an induction motor by means of controlling independently the voltage, the synchronous frequency, and the slip frequency at an operating point of the motor.

When using an induction motor at speeds other than normal operating speed, a region of poor dynamic response for operating points at low or intermediate frequencies is frequently encountered. Typically, this poor dynamic response or operational instability is characterized by an undamped or an only slightly damped oscillation in the output speed of the motor. This oscillation frequently is manifested by small perturbations in the load torque on the motor. The phenomonon is frequently referred to in the art as "cogging".

2. Description of the Prior Art

Various attempts have been made in the prior art to solve the problem of induction motor operational instability. One attempt has been to alter the effective actual stator resistance of a machine by feeding back rectified and smoothed stator current to change the effective value of the stator resistance of the induction motor. Furthermore a method of feedback of the derivative of a DC link current to control the inverter frequency of the inverter which makes up part of the drive circuit of the motor has been used to attempt stabilization control of the operation of the motor by increasing rotor leakage inductance. This has a serious disadvantage in decreased maximum torque and decreased slip frequency at the maximum torque.

SUMMARY OF THE INVENTION

This invention improves on the prior art methods of operating induction motor drives by developing a stability control system which utilizes signals indicative of rotor speed and position to generate an applied stator voltage of magnitude and slip frequency sufficient to achieve stable motor operation under a wide range of rotor speeds. The rotor voltage may be maintained equal to zero by using an induction motor of squirrel cage design or by short-circuiting the rotor windings.

Hence, it is an object of this invention to overcome the aforementioned poor dynamic response of a motor, such as found in the prior art, by providing a control system which enables the motor to operate with more desirable performance characteristics.

It is a further object of the invention to operate an induction motor over its entire operational range with improved dynamic response by providing means for controlling the voltage applied to the stator of the motor.

These objects are achieved by the control system of the invention which independently regulates the voltage and the synchronous frequency, and consequently the slip frequency of an induction motor by applying a stator voltage at a desired synchronous frequency to the motor. Independent regulation is achieved by having only one of voltage or synchronous frequency, but not both, responsive to motor performance. The system-derived magnitude of the voltage is derived from an error signal indicative of the difference between true rotor speed and a desired rotor speed. The voltage magnitude and frequency are sufficient to develop a true rotor speed equal to the desired rotor speed at the operating condition. The system also permits modification of the desired rotor speed to enhance system performance as, for example, to correct for position error.

A vital portion of the invention is the concept of introducing a predetermined appropriate slip frequency as an actual input to modify the rate command in the control system as opposed to the mere variation of command rate and voltage to obtain an apparently correct operational speed so as to obtain an operational stability.

The above as well as other objects and advantages of the invention will be more readily understood from the following detailed description when considered in conjunction with the accompanying drawings wherein:

DRAWINGS

PREFERRED EMBODIMENT

Figure 1:
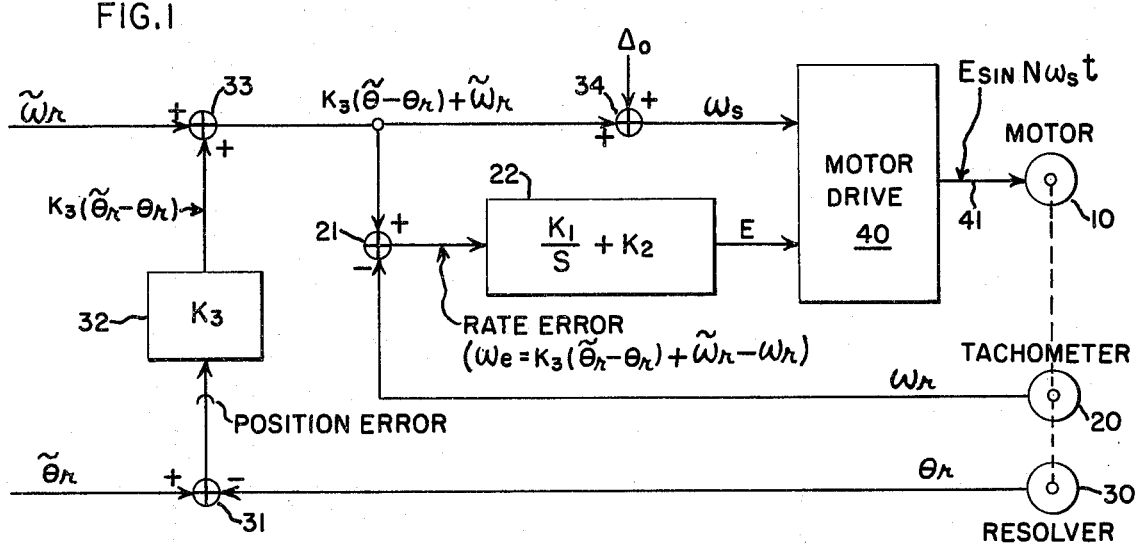
FIG. 1 shows a diagram of the system of the invention whereby desired control of voltage, snychronous frequency, and slip frequency is obtained, including a position error correction loop which may enhance operation of the invention in a pointing and tracking system.
Figure 4:
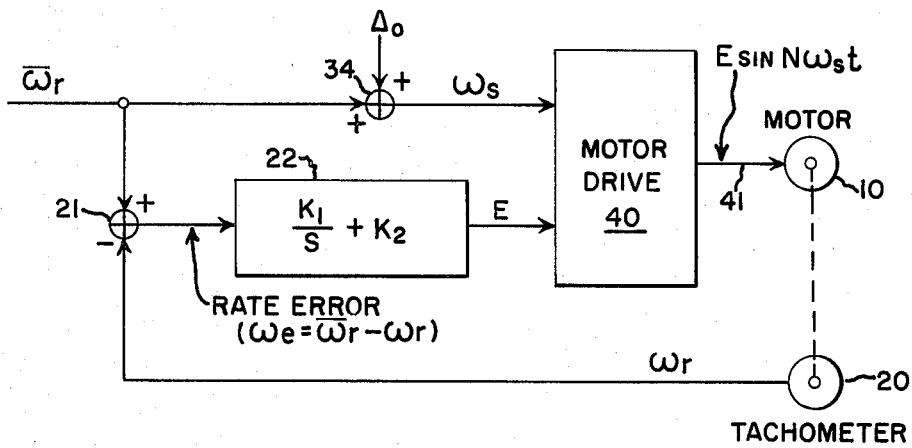
FIG. 4 shows a diagram of the system of the invention as illustrated in FIG. 1 but without a position error correction loop.

Referring now to FIG. 4, one form of the apparatus according to the invention for providing independent control of voltage, synchronous frequency, and slip frequency for an induction motor is shown. A signal indicative of the true speed of the rotor of an induction motor 10 is obtained from the tachometer 20. This signal, designated $\omega_r$, is passed to a summing junction 21. Summing junction 21 also receives a signal $\bar{\omega}_r$, which is a signal indicative of a desired rotor speed. This latter signal, however, is often modified in use to a signal which is weighted as, for example, by the position loop as shown in FIG. 1 to reflect position error. Modification of $\bar{\omega}_r$ by insertion of a position error signal has particular utility in servo systems to cause a position error to temporarily accelerate the desired track rate to overcome the position error. A resolver 30 derives a signal $\theta_r$ indicative of true rotor position. Although FIG. 1 shows a $\theta_r$ derived from a resolver 30 responsive to movement of motor 10, $\theta_r$ could be derived in other ways, e.g., from a target acquisition component in a pointing and tracking system. The signal $\theta_r$ is then applied to summing junction 31. Summing junction 31 also receives a signal $\bar{\theta}_r$ indicative of desired rotor position. The resultant output signal at summing junction 31 represents a position error signal of $\bar{\theta}_r-\theta_r$ indicating the difference between the true rotor position $\theta_r$ and the desired rotor position $\bar{\theta}_r$. This position error signal $\bar{\theta}_r-\theta_r$ is fed to amplifier 32 having again $K_3$ which produces an output signal which is a weighted value of the position error signal, i.e., $K_3(\bar{\theta}_r-\theta_r)$. The weighted position error signal $K_3(\bar{\theta}_r-\theta_r)$ is fed to summing junction 33 which adds the weighted position error signal to the desired rotor rate signal $\bar{\omega}_r$. The output $\bar{\omega}_r + K_3(\bar{\theta}_r-\theta_r)$ at junction 33, the sum of the signals applied to junction 33, is applied to both summing junctions 21 and 34 and for convenience can be referred to as the desired rate control signal $\omega_r$. In the form of the invention illustrated in FIG. 4 wherein no position error correction system is present, the $\omega_r$ signal representing the desired rotor rate may be applied directly to the summing junctions 21 and 34 as the "desired rate control signal" without the use of a summing junction such as 33 shown in FIG. 1. Summing junction 21 subtracts the true rotor speed from the sum of the desired rotor speed and the weighted position error. The signals indicating desired rotor position $\bar{\theta}_r$ and desired rotor rate $\bar{\omega}_r$ are derived or introduced from operator inputs, as for example, from an operator managed controller or from other system conditions in the case of automatic or responsive systems. These signals are introduced in any convenient data transmission or telemetry language.

The output of summing junction 21 $\omega_e$ thus becomes a rotor speed or rate error signal. This rate error signal is applied to circuit 22 consisting to derive the particular function of the rate error, i.e., $f(\omega_e)$, chosen to comply with the system, motor and operational parameters. In the preferred embodiment described which is based on the system actually mechanized by Applicants, circuit 22 consists principally of an integrator and an amplifier. Circuit 22 produces an output signal E having a voltage equal to the sum of a weighted integral of the rate error signal and a weighted rate error signal as produced by the amplifier. The output of circuit 22 is applied to the motor drive circuit 40 as a voltage amplitude control signal and the combination of summing junction 21 and circuit 22 may be referred to as a voltage amplitude channel. The circuitry 40 is such that it will accept, as two inputs, a voltage amplitude command (E) and a frequency command ($\omega$) and produce balanced phased sinusoids of the form $E \sin(\omega t + \phi)$; where $\phi$ is the phase angle. One implementation, as depicted in the schematic of FIG. 1, is a pulse width modulated (PWM) inverter of a commercially available type. In the alternative this motor drive circuitry can be of any convenient type known in the art such as the type of circuitry described by Guyeska, U.S. Pat. No. 3,372,323 (column 3, lines 51-55), having a frequency changer "of any convenient type which receives primary power and converts its frequency and voltage in accordance with signals received at a frequency control input and a voltage control input, respectively."

As heretofore stated, the output of summing junction 33, that is, the sum of the desired rate signal plus the weighted position error signal is applied to summing junction 34 in the frequency channel. Summing junction 34 also receives a signal $\Delta_o$ representing the desired slip frequency for stable operation of the motor. The slip frequency signal $\Delta_o$, is chosen so that the induction motor has good dynamic response and the overall system is stable. Empirically and analytically derived data show that the slip frequency signal, $\Delta_o$, will have an optimal value for each desired rotor rate signal, $\bar{\omega}_r$. For most applications, however, adequate motor response and system stability can be achieved with a constant slip frequency signal, $\Delta_o$, which may correspond to the value of $\Delta_o$ for the most critical rotor rate. It is noted that the prior art has neglected adequate control of the slip frequency signal, $\Delta_o$. Thus, no prior effort has been made to circumvent the small slip frequency operating regions where induction motor performance is poor and stability is marginal at best.

The output $\omega_s$ of the junction 34 represents the sum of the desired rotational speed $\bar{\omega}_r$, the weighted position error signal and the desired slip frequency $\Delta_o$:

$$\omega_s = \bar{\omega}_r + K_3(\bar{\theta}_r - \theta_r) + \Delta_o \qquad (1)$$

The foregoing sum $\omega_s$ represents the desired mechanical synchronous frequency (speed) of the induction motor, and this desired synchronous speed signal is also applied, proportionally or directly as shown to the motor drive circuits 40.

The motor drive circuits 40 produce a polyphase sinusoidal output voltage:

$$E \sin N \omega_s t \qquad (2)$$

which is the voltage applied at 41 to the stator of the induction motor 10. This sinusoidal voltage is developed by the drive circuits 40 to oscillate at the desired applied frequency, $N \omega_s$, which is the mechanical synchronous frequency $\omega_s$ multiplied by the number of pole pairs, N, in the motor 10. The drive circuits 40 also develop a magnitude for the sinusoidal output voltage equal to the signal E obtained from circuit 22, that is, equal to a weighted value of the integral of the rate error signal plus a weighted value of the rate error signal itself.

As mentioned above, the synchronous frequency $\omega_s$ is derived from the commanded or desired rotor rate $\bar{\omega}_r$, weighted position error signal $K_3(\bar{\theta}_r-\theta_r)$ and a desired slip frequency $\Delta_o$. Under steady state operating conditions of the motor, the position error $(\bar{\theta}_r-\theta_r)$ is zero and the mechanical synchronous frequency $\omega_s$ is greater than the commanded rotor rate $\bar{\omega}_r$ by the desired fixed slip frequency $\Delta_o$. According to the system of this invention, an applied voltage E is derived in 22 from an integral feedback and a proportional feedback of the rate error signal $\omega_e$ indicative of the difference between the desired rotor rate $\bar{\omega}_r$ plus the weighted position error signal, and the true rotor speed $\omega_r$:

$$\omega_e = K_3(\bar{\theta}_r-\theta_r) + \bar{\omega}_r - \omega_r \qquad (3)$$

An integral feedback $K_1/S\, [\bar{\omega}_r + K_3(\bar{\theta}_r-\theta_r) - \omega_r]$ generated by the integrator in 22 accounts for variations of system and motor parameters and this integral feedback also forces the rate and position errors to a zero value in any steady state mode of motor operation. A direct proportional feedback $K_2\,[\bar{\omega}_r + K_3(\bar{\theta}_r-\theta_r) - \omega_r]$ generated by the amplifier in 22 provides for a quick system response to disturbances about the operating point. Therefore the signal produced by circuitry 22 is:

$$E = \omega_e \frac{K_1}{S} + \omega_e K_2 ; \qquad (4)$$

$$= \left(\frac{K_1}{S} + K_2\right)[K_3(\bar{\theta}_r - \theta_r) + \bar{\omega}_r - \omega_r] \qquad (5)$$

As a result of forming synchronous frequency $\omega_s$ and voltage control signal E as described, only E and not $\omega_s$ will be responsive to motor output or performance. Accordingly, for a common input signal, $\bar{\omega}_r$ (the desired rate control signal), the circuit channels for producing $\omega_s$ and E are independent (or decoupled) from each other, including the fact that only E is responsive to feedback. Thus, the synchronous frequency $\omega_s$ is independent of variations in the voltage control signal E and in addition is independent of variations in motor performance resulting from variations in the voltage control signal E. The voltage control signal E is independent of variations in the synchronous frequency signal $\omega_s$ but is responsive to variations in motor speed $\omega_r$ resulting from variations in synchronous frequency $\omega_s$. The two circuit channels are, therefore, "decoupled" or independent of each other. This system provides that the motor slip frequency $\Delta$ will equal the reference slip frequency only when $\omega_r = \bar{\omega}_r$. But more importantly, any needed torque can be obtained by varying E independently of $\omega_s$, a possibility inherent in the independence of the frequency and amplitude channels and a feature which provides that changes in $\omega_r$ resulting from an increase (or a decrease) in torque will not effect changes in $\omega_s$. Reaction changes in $\omega_s$ of the type that would result if $\omega_s$ were also responsive to changes in $\omega_r$ (as common in prior art systems, e.g., Guyeska 3,372,323) would effect a further reactionary change in torque, in turn causing a further change in $\omega_r$. Unless the original change in E in such system accurately predicts and accounts for the chain of reactions "hunting" may occur. Applicants' systems, with the independency of frequency and amplitude channels, precludes the hunting by interdicting the reaction chain.

As already noted, use of position error based on $\theta_r$ is representative of the adaptability of this control technique to use in systems such as servo systems requiring wide range and high accuracy and is not the primary feature of the invention. Even the full system of FIG. 1 including the position error loop maintains the kind of channel independency which provides the desired motor control responses including the limitation on hunting. This is so because the resolver position signal $\theta_r$ (in any embodiment using it) is not used as a true feedback in the same sense as $\omega_r$. $\omega_r$ is used as a direct feedback in that $\omega_e = \bar{\omega}_r - \omega_r$. $\theta_r$ is used with $\bar{\theta}_r$ to form an error measurement which after being weighted is used only to bias an input to the "inner loop" made up of the primary control channels. Under these circumstances, first in any system in which the position error weighting factor $K_3$ did not completely absorb all small angles, the "independency" would not be destroyed as the position error would affect only the rate of response, not the degree of response to allow the independency to shut off the reactions to preclude hunting. Accordingly, in the invention as depicted in FIG. 4 the independence of the two channels and the fact that the frequency channel producing $\omega_s$ is independent of direct or indirect feedback are made obvious.

The slip frequency $\Delta_o$ and feedback gain values $K_1$, $K_2$, and $K_3$ of the systems shown are selected, as known in the art, to provide desired dynamic response and stability of the system.

The system of FIG. 1 operates such that for a fixed commanded rotor rate $\bar{\omega}_r$ and a corresponding time-varying commanded position $\bar{\theta}_r$, the control system derives a mechanical synchronous frequency $\omega_s$ such that the motor slip frequency will equal the desired slip frequency $\Delta_o$ at any desired operating point.

As is well known, for fixed values of synchronous frequency and slip frequency, the electromagnetic torque developed by the motor is proportional to the square of the magnitude of the stator voltage. The feedback integrator of the system of this invention maintains and holds a stator voltage value at a proper magnitude to maintain the required output torque.

The circuitry shown schematically in FIG. 1 can readily be implemented by anyone skilled in the commonly used techniques. Electronic components are available commercially, or can be made based on design information well known in the art to perform the various summing, amplifying and integrating processes in any technique of circuit design.

Figure 3:
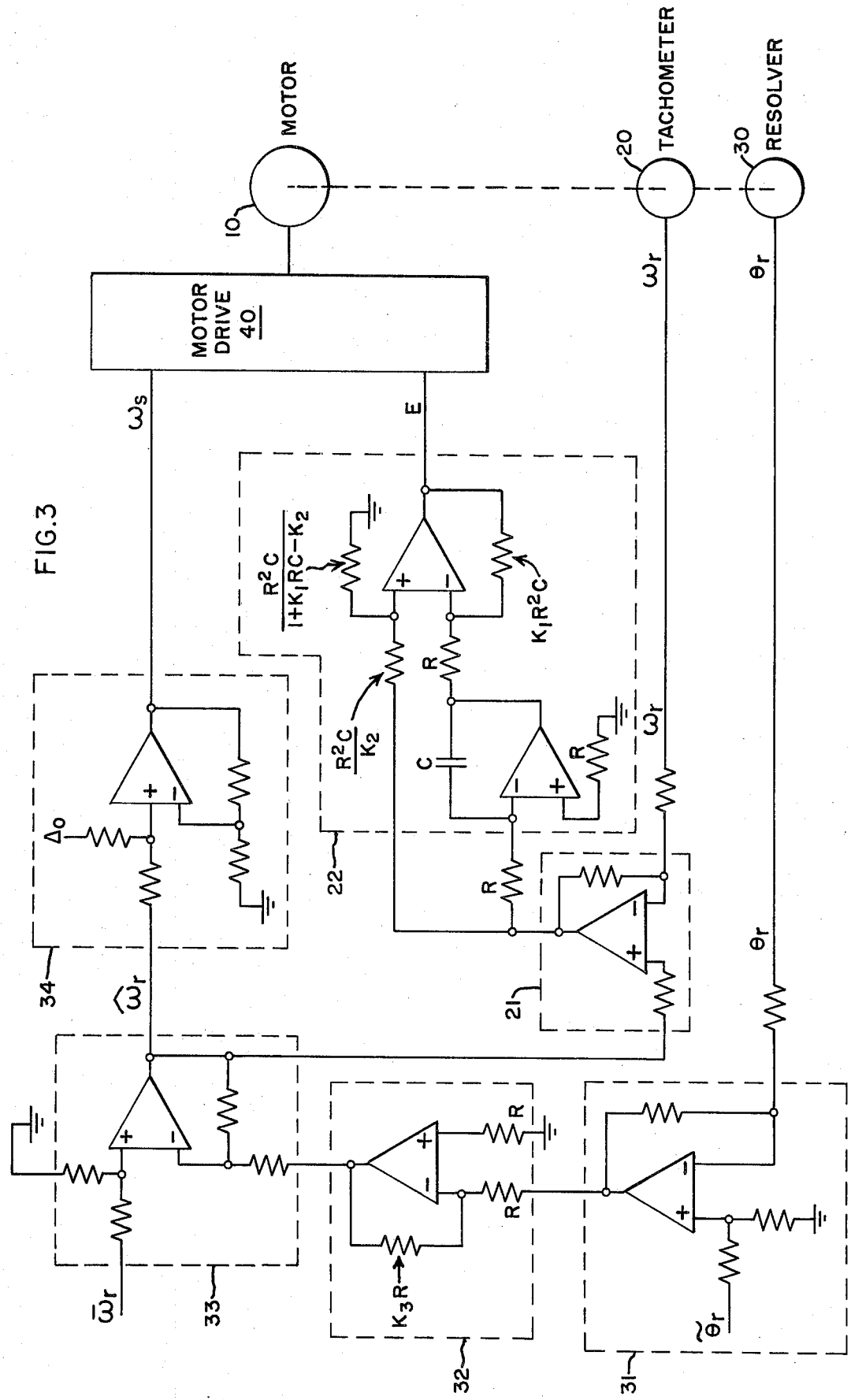
FIG. 3 shows an analog electronic circuit which is homologous to the system block diagram of FIG. 1.

The system block diagram of FIG. 1 can be implemented using digital analog or hybrid circuitry. A typical detailed analog implementation of the system block diagram shown in FIG. 1 is illustrated in FIG. 3. The system, as described hereinabove, consists of commercially available operational amplifiers used in the classical summing amplifier configuration as illustrated by blocks 31, 33, 34, 21 and the second amplifier in block 22. The system also consists of operational amplifiers used in the classical voltage gain configuration as illustrated by block 32. An operational amplifier used in the classical integrator configuration is illustrated by the first amplifier in block 22. All component values (i.e., resistors, R, and capacitors, C) are any necessary value as recommended by the manufacturer to insure proper operation of the particular device used.

Figure 2:
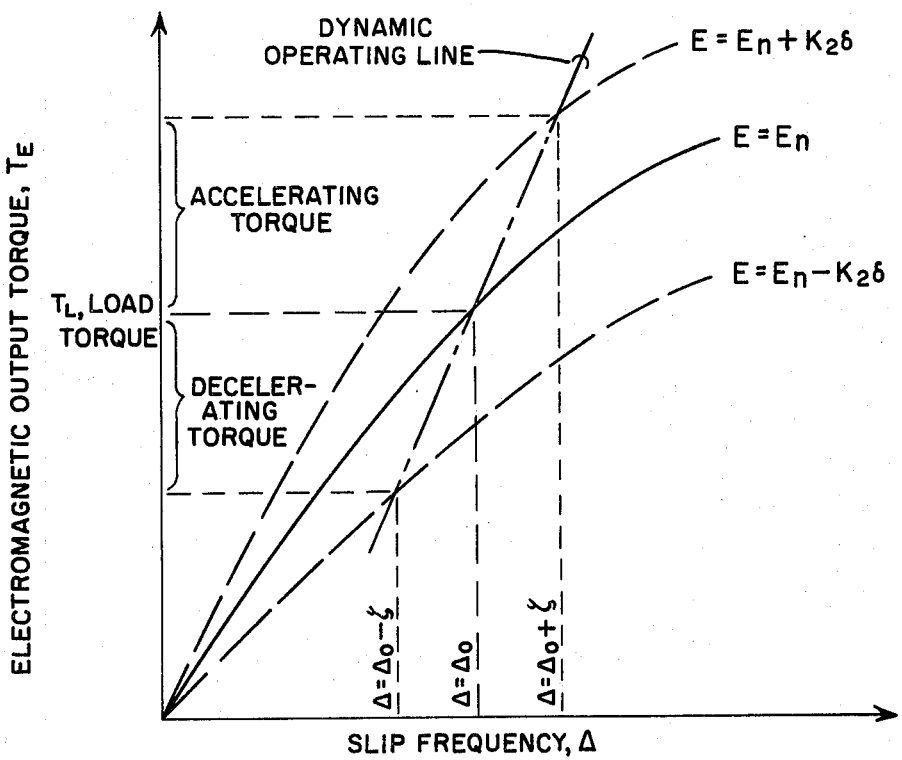
FIG. 2 is a graphical representation of output torque versus slip frequency of an induction motor for differing values of stator voltage illustrating the operating characteristics of the system of the invention.

FIG. 2 shows the Electromagnetic Torque Output $T_E$ of an induction motor operating in conjunction with the control system of this invention as a function of the Slip Frequency $\Delta$ of the motor for a fixed mechanical synchronous frequency $\omega_s$ and nominal applied voltage $E_n$. If the rotor rate $\omega_r$ instantaneously slows by amount $\delta$, and the synchronous frequency remains unchanged, the slip frequency will correspondingly increase to ($\Delta_o + \delta$). The proportional feedback ($K_2$ in 22) increases the applied voltage magnitude E of the voltage $K_2 \delta$ to form $E = E_n + K_2 \delta$. These two effects increase the electromagnetic output torque which accelerates the rotor back to its commanded speed $\bar{\omega}_r$. For rapid changes of rotor speed, the effect of the position and integral rate feedback can be neglected since these respond much more slowly than the direct proportional rate feedback. An increase in motor speed will be similarly compensated by a decrease in slip frequency to $\Delta_o - \delta$. This results in a decrease of the applied voltage by an amount $K_2 \delta$. Thus, the result would be reduced electromagnetic torque output and the rotor will decelerate. The dynamic operating line as shown in FIG. 2 represents the effect of the control system for varying values of E as realized by the system as described above.

The foregoing has shown how the control system of the invention as described facilitates the use of a dynamoelectric machine in regions of heretofore reduced stability and performance. The system of this invention, as has been shown, further allows motor operation over a wide range of rotor speeds while ensuring stable operation by means of controlling synchronous speed, slip speed, and voltage to maintain steady output speed and torque.

Having shown and described an embodiment of the invention, it is to be understood that the invention is not limited to the details of the example shown, and other modifications, applications or variations will occur to those skilled in the art without departing from the spirit and scope of the invention as defined in the following claims.

We claim:

1. In a system for controlling a motor having a stator and a rotor for stable operation over a wide range of rotor speeds wherein motor control is effected by control of the amplitude and frequency components of the drive voltage applied to the motor, apparatus for control of the motor slip frequency comprising the combination of independent:
   a. means for variation of the voltage amplitude responsive to a function of the algebraic sum of the commanded and actual rotor speeds; and
   b. means for variation of the frequency of the said voltage applied to said motor responsive to a function of the algebraic sum of said commanded rotor speed and the desired slip frequency;
   said means for variation being independent of each other and said means for variation of the frequency being independent of rotor speed whereby variation of said voltage amplitude will not cause a reactionary change in motor frequency and whereby the actual slip frequency of said motor is free to vary until true rotor speed approaches the desired rotor speed.

2. Apparatus for controlling the voltage applied to a motor having a stator and a rotor comprising:
   a. first electrical signal summing means for producing a rate error signal proportional to the difference between the true rotor speed and the desired rotor speed of the motor to be controlled;
   b. a second electrical signal summing means for producing a synchronous frequency signal proportional to the sum of the desired rotor speed and a desired slip frequency of the motor to be controlled;
   c. amplifier circuitry responsive to said first summing means for producing a magnitude signal proportional to a function of said error signal; and
   d. motor drive circuitry means responsive to said second electrical signal summing means and to said amplifier circuitry for applying an alternating voltage to said stator whose magnitude is proportional to the said magnitude signal and whose frequency is said synchronous frequency multiplied by the number of pole pairs of said rotor;
   whereby the actual slip frequency of said motor is free to vary until true rotor speed approaches the desired rotor speed.

3. The apparatus of claim 1 wherein said function of said error signal to which said magnitude signal is proportional is a function of said error signal and the integral of said error signal.

4. Apparatus for controlling the voltage of a motor having a stator and a rotor comprising:
   a. a frequency channel circuit for producing a synchronous frequency signal which is a function of the desired rotor rate and the desired motor slip frequency including:
      1. electronic amplifier means for receiving signals representing the desired rotor rate and slip frequencies and for generating said synchronous frequency signal as a function of the sum of said signals received;
   b. a voltage magnitude channel circuit for producing a voltage magnitude signal which is a function of the rate error of the rotor including:
      1. first electronic amplifier means for receiving and summing signals representing the desired and the actual rotor rate to form a signal representing the rate error of the rotor, and
      2. second electronic amplifier means for receiving and amplifying said rate error signal according to a predetermined function;
   c. motor drive circuitry responsive to both said frequency and voltage magnitude channel circuits and to a source of electrical power for applying an alternating voltage to said stator, said alternating voltage having a magnitude proportional to said voltage magnitude signal and a frequency proportional to said synchronous frequency signal.

5. The apparatus of claim 4 wherein the predetermined function according to which the said second electronic amplifier means amplifies said rate error signal is a function of said error signal and the integral of said error signal.

6. In a motor control system having an induction motor, motor drive circuits producing a stator voltage of the type $E \sin N\omega_s t$ and having means for producing a signal measuring the actual speed of the rotor of said motor, the combination comprising:
   a. a frequency channel circuit for producing and applying to said motor drive circuits a synchronous frequency signal which is proportional to the sum of the desired rotor rate and the desired slip frequency, said frequency channel circuit including:
      1. electronic amplifier means for summing a commanded signal representing a desired motor slip frequency and a commanded signal representing the desired rotor rate; and
   b. a voltage magnitude channel circuit for producing and applying to said motor drive circuits a voltage magnitude signal which is a function of the rate error of the rotor, said magnitude channel circuit including:
      1. first electronic amplifier means for summing said signal measuring the actual speed of said rotor and said commanded signal representing the desired rotor rate to form a signal representative of said rate error, and
      2. second electronic amplifier means responsive to said first electronic amplifier means for amplifying said rate error signal for producing said magnitude signal;
      said frequency and voltage magnitude channel circuits being independent whereby the magnitude of the voltage applied to said stator can vary independently of the alternating frequency of that voltage.

7. The motor control system combination of claim 6 wherein said second electronic amplifier means for amplifying said rate error signal further comprises integrating and summing amplifier means responsive to said rate error signal for producing as an outupt the sum of the weighted rate error signal and the weighted integral of the rate error signal.

8. In a system for controlling a motor having a stator and a rotor including drive circuitry for applying a power voltage to said stator, said power voltage being controlled as to amplitude and frequency in response to voltage amplitude and frequency control signals, and including control circuitry responsive to motor performance and to command signals for producing said voltage amplitude and frequency control signals, the improvement wherein said control circuitry comprises:
 a. electronic means for supplying
  1. a command rate signal,
  2. a command slip frequency signal, and
  3. an actual rate signal proportional to the rate of the rotor of said motor;
 b. a frequency control channel responsive to said command rate signal and to said command slip frequency for producing said frequency control signal, said frequency channel including means for summing said command signals to form said frequency control signal; and
 c. a voltage amplitude channel responsive to said command rate signal and to said actual rate signal for producing said voltage amplitude signal, said voltage amplitude channel including:
  1. a summing means for producing a rate error signal which is the difference between said command rate and said actual rate signals, and
  2. amplifier means responsive to said rate error signal for producing said voltage amplitude signal as a signal proportional to a function of the rate error;
   whereby the actual slip frequency of said motor is permitted to fluctuate until said motor approaches its commanded rate.

9. The improved motor control system of claim 8 wherein said amplifier means of said voltage amplitude channel further comprises integrating and summing amplifier means whereby said function is the sum of the weighted rate error and the weighted integral of the rate error.

* * * * *

UNITED STATES PATENT OFFICE
CERTIFICATE OF CORRECTION

PATENT NO. : 3,896,356

DATED : JULY 22, 1975

INVENTOR(S) : ROBERT E. HOFFMAN, JOHN A. CLINE, CHRISTOPHER S. FUSELIER, JOHN D. D'ATRE

It is certified that error appears in the above-identified patent and that said Letters Patent are hereby corrected as shown below:

Claim 3, Column 7, line 64, delete "1" and insert --2--.

Signed and Sealed this seventh Day of October 1975

[SEAL]

Attest:

RUTH C. MASON
Attesting Officer

C. MARSHALL DANN
Commissioner of Patents and Trademarks